(12) United States Patent
Folchert

(10) Patent No.: US 7,097,166 B2
(45) Date of Patent: Aug. 29, 2006

(54) AIR SUPPLY SYSTEM FOR A MOTOR VEHICLE

(75) Inventor: Uwe Folchert, Lauenau (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/848,110

(22) Filed: May 19, 2004

(65) Prior Publication Data

US 2004/0262986 A1 Dec. 30, 2004

(30) Foreign Application Priority Data

May 20, 2003 (DE) ............................... 103 22 578

(51) Int. Cl.
*F16F 5/00* (2006.01)

(52) U.S. Cl. ............................... 267/64.28; 280/124.16

(58) Field of Classification Search ............. 267/64.16, 267/64.28; 280/124.104, 124.106, 124.157, 280/124.158, 124.159, 124.16, 124.161, 280/5.514

See application file for complete search history.

(56) References Cited

U.S. PATENT DOCUMENTS

| | | | | |
|---|---|---|---|---|
| 6,332,623 | B1 * | 12/2001 | Behmenburg et al. | ... 267/64.28 |
| 6,685,174 | B1 * | 2/2004 | Behmenburg et al. | ... 267/64.28 |
| 6,726,189 | B1 * | 4/2004 | Folchert et al. | .......... 267/64.28 |
| 2003/0047853 | A1 * | 3/2003 | Behmenburg | ............ 267/64.28 |

FOREIGN PATENT DOCUMENTS

DE 42 35 111 4/1994

* cited by examiner

*Primary Examiner*—Robert A. Siconolfi

(57) ABSTRACT

In addition to the consumers of a closed loop, known air supply systems also can supply an external consumer with fresh pressurized air. These systems are very complex with respect to apparatus and furthermore have the disadvantage that already improved pressurized air can escape from the pressurized air store during the supply of the external consumer. A switchable 3/2-directional valve (31) is arranged in the first consumer pressure line (19) of the drive unit (1) and a switchable 3/2-directional valve (32) is mounted in the store pressure line (11) of the drive unit (1) and a switchable check valve is mounted in the bypass line (16) of the store pressure line (11). This check valve disables the throttle function of the bypass throttle (17).

6 Claims, 1 Drawing Sheet

AIR SUPPLY SYSTEM FOR A MOTOR VEHICLE

CROSS REFERENCE TO RELATED APPLICATION

This application claims priority of German patent application no. 103 22 578.1, filed May 20, 2003, the entire content of which is incorporated herein by reference.

BACKGROUND OF THE INVENTION

Air supply systems are utilized especially for supplying air spring damper units for the leveling control of a motor vehicle within a closed loop but also to supply external consumers.

U.S. Pat. No. 6,726,189 discloses one such air supply system in various embodiments.

In the first embodiment of FIG. 1 of this patent, the air supply system comprises: several air spring damper units arranged in parallel to each other, a compressor and a pressurized air store. A 2/2-directional valve is assigned to each air spring damper unit and the air spring damper units are connected via a common ring line to the intake end as well as to the pressure end of the compressor. In this ring line, a switchable intake valve is also provided. A second ring line connects the pressurized air store to the intake end and to the pressure end of the compressor. In this ring line, an air dryer is arranged on the pressure end which has a free flow via a throttle check valve in the through-flow direction to fill the pressurized air store and this through-flow is throttled in the opposite through-flow direction for flushing the air dryer.

In this air supply system, the compressor can transfer pressurized air from the air spring damper units into the pressurized air store and, in the opposite direction, fill the air spring damper units with air from the pressurized air store. Furthermore, the compressor can supply the air spring damper units or the pressurized air store with fresh air from the atmosphere. A further function comprises venting pressurized air into the atmosphere from the pressurized air store in the opposite direction via the air dryer in order to regenerate the latter. Several directional valve units are provided in both ring lines to realize these various functions. Accordingly, and in accordance with FIG. 1, two parallelly-connected 2/2-directional valves are used for the first ring line and two likewise parallelly-connected 2/2-directional valves are used for the second ring line.

This embodiment of the air supply system has the disadvantage that no consumer, which lies outside of the closed loop, can be supplied with pressurized air. In this way, the power capacity of the compressor is not fully utilized.

Accordingly, in FIG. 8 of U.S. Pat. No. 6,726,189, a second embodiment provides for a branching between the compressor and the air dryer for a line connection to supply an external consumer. With this embodiment of the air supply system, for example, a tire-fill apparatus can be operated as shown.

This embodiment has the disadvantage that it is very complex and therefore very expensive with respect to its manufacture. This is caused by the additional units for tire filling and has its cause, however, also in the plurality of 2/2-directional valves required for the closed loop.

SUMMARY OF THE INVENTION

In view of the above, it is an object of the invention to provide an air supply system for supplying consumers of a closed loop and for additionally supplying at least one external consumer with this air supply system having a reduced number of directional valves.

An air supply system of the invention is for a motor vehicle. The air supply system is for supplying consumer means of a closed loop and for supplying an external consumer and includes: a pressurized air store; an intake connection communicating with the atmosphere; a compressor; a first consumer pressure line; a second consumer pressure line connected to the external consumer; a store pressure line connected to the compressor; a first switchable 3/2-directional valve arranged in the first consumer pressure line; a second switchable 3/2-directional valve arranged in the store pressure line; the first and second 3/2-directional valves being configured so that: (a) the compressor conveys fresh air from the atmosphere through the intake connection to the pressurized air store; and/or, (b) the compressor conveys fresh air to the external consumer and transfers already compressed pressurized air between the consumer means and the pressurized air store; a check valve in the store pressure line; a bypass line connected into the store pressure line to bypass the check valve; a throttle connected into the bypass line; and, a switchable blocking valve arranged in the bypass line to disable the functioning of the throttle.

The new air supply system eliminates the above-mentioned disadvantages of the state of the art. Accordingly, only two 3/2-directional valves are needed compared to four 2/2-directional valves in accordance with the closest state of the art. This simplifies the configuration of the pneumatic loop and thereby reduces the manufacturing cost of such an air supply system. The special advantage of the new air supply system is that, in the phase for filling the vehicle tires, dry and compressed air from the pressurized air supply cannot escape either via the intake line and the running compressor or via the non-used store pressure line and the dryer and cannot mix with the fresh air flow drawn in by suction for filling the tires. The leakage via the compressor is prevented by the pressure position of the 3/2-directional valve in the store pressure line and the switchable check valve in the bypass line of the store pressure line prevents the escape of the pressurized air via the dryer. The pressure position of the 3/2-directional valve blocks the intake line.

It is also advantageous that the additional check valve is a 2/2-directional valve and is mounted in the bypass line because, in this way, the 2/2-directional valve can be configured to be built very small because of the throttled and therefore reduced bypass flow. The additional complexity is, in addition, still reduced in that the additional 2/2-directional valve and the bypass throttle are combined in a valve combination.

It is also advantageous if the line, which extends from the switchable outlet valve of the directional valve unit into the atmosphere, is utilized as a second consumer pressure line for the supply of the external consumer. This saves additional complexities for the realization of the second consumer pressure line.

BRIEF DESCRIPTION OF THE DRAWING

The invention will now be described with reference to the single figure (FIG. 1) of the drawing which shows the closed loop of an air supply system for the level control of a motor vehicle.

DESCRIPTION OF THE PREFERRED EMBODIMENTS OF THE INVENTION

Figure 1:
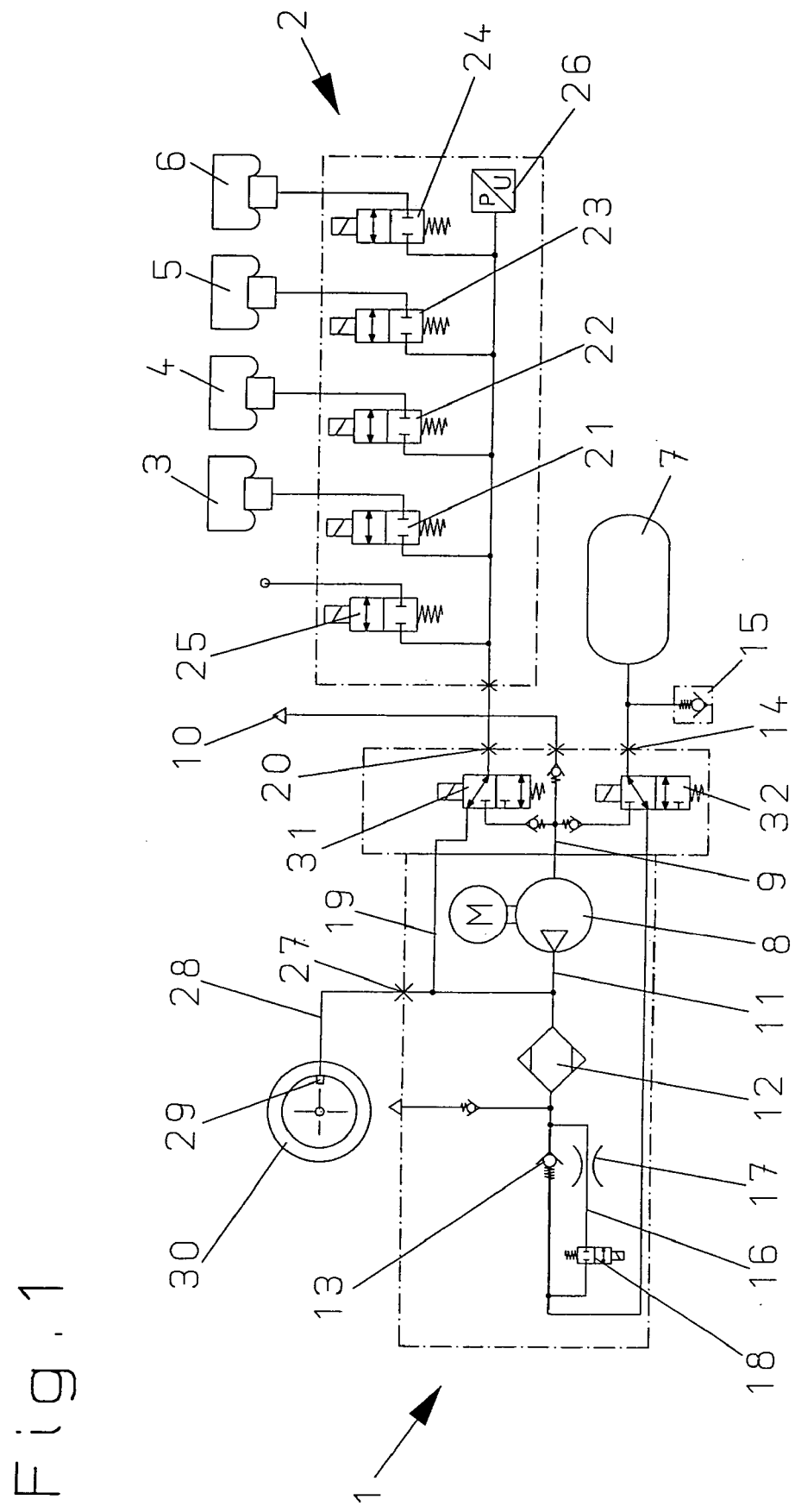

The air supply system of the invention essentially comprises: a drive unit 1, a directional valve unit 2, four air spring damper units 3 to 6 and a pressurized air store 7.

The primary component of the drive unit 1 is a compressor 8 which is driven by an electric motor M and which, on the one hand, is connected via an intake line 9 to an intake connection 10 leading into the atmosphere. On the other hand, the compressor 8 has a store pressure line 11 which leads via a dryer 12 and a check valve 13 to a store connection 14. The store connection 14 of the drive unit 1 is connected to the pressurized air store 7 and an intake valve 15, which is connected to the atmosphere, is disposed between the store connection 14 and the pressurized air store 7. The check valve 13 is arranged in the store pressure line 11 so that it opens in the direction toward the pressurized air store 7. In addition, a bypass line 16 is disposed in the store pressure line 11. The bypass line 16 bypasses the check valve 13 and the following are arranged in the bypass line 16: a bypass throttle 17 and an electromagnetically-controlled 2/2-directional valve 18 which disables the bypass throttle 17.

A first consumer pressure line 19 branches away from the store pressure line 11 between the compressor 8 and the dryer 12. The first consumer pressure line 19 leads to a first consumer connection 20. This first consumer connection 20 of the drive unit 1 is connected to the directional valve unit 2.

The directional valve unit 2 includes four 2/2-directional valves 21 to 24 which are controlled electromagnetically and which are arranged in parallel to each other. The four 2/2-directional valves 21 to 24 each connect the first consumer connection 20 of the drive unit 1 to respective ones of the four air spring damper units 3 to 6. A switchable venting valve and a pressure sensor 26 are disposed in the directional valve unit 2. The venting valve 25 connects or interrupts the first consumer connection 20 of the drive unit 1 and the atmosphere and the pressure sensor 26 checks the pressure in the first consumer pressure line 19.

The drive unit 1 also includes a second consumer connection 27 which connects the compressor 8 to a filling apparatus 29 for a vehicle tire 30 via a second consumer pressure line 28.

A first electromagnetically-controlled 3/2-directional valve 31 is arranged within the drive unit 1 and in the first consumer pressure line 19. The 3/2-directional valve 31 is, on the one hand, connected to the pressure end of the compressor 8 and to the intake end of the compressor 8 and, on the other hand, to the directional valve unit 2. A second 3/2-directional valve 32 is disposed in the store pressure line 11 of the drive unit 1 between the 2/2-directional valve 18 of the bypass line 16 and the store connection 14. The 3/2-directional valve 32 is likewise connected, on the one hand, to the pressure end of the compressor 8 and to the intake end of the compressor 8 and, on the other hand, to the pressurized air store 7.

To fill the pressurized air store 7 with fresh air from the atmosphere, the compressor 8 draws the fresh air via the intake connection 10 and pumps the air via the dryer 12, the opening check valve 13 and the 3/2-directional valve 32 (in the shown pressure position) into the pressurized air store 7. A part of the pumped flow flows also via the bypass throttle 17 and the open 2/2-directional valve 18 in the bypass line 16. The 3/2-directional valve 31 in the consumer pressure line 19 is blocked in the pressure position shown so that no pressurized air reaches the directional valve unit 2.

To fill one or several air spring damper units 3 to 6 with compressed pressurized air from the pressurized air store 7, the 3/2-directional valve 32 in the storage pressure line 11 is switched into the intake position and the 3/2-directional valve 31 in the first consumer pressure line 19 is switched into the pressure position shown. The compressor 8 draws the pressurized air via the 3/2-directional valve 32 and moves the pressurized air into the first consumer pressure line 19 and there, to the selected air spring damper units 3 to 6 via the 3/2-directional valve 31 and the corresponding 2/2-directional valve 21 to 24 of the directional valve unit 2.

To transfer excessive and dry pressurized air from one or several air spring damper units 3 to 6 back into the pressurized air store 7, the 3/2-directional valve 31 in the first consumer pressure line 19 is in the intake position and the 3/2-directional valve 32 of the store pressure line 11 is in the pressure position. The compressor 8 then draws via the consumer pressure line 19 from the directional valve unit 2 and conveys into the store pressure line 11 to the pressurized air store 7.

To regenerate the dryer 12, excessive and dry pressurized air is released from the pressurized air store 7 and is conducted opposite to the fill direction via the dryer 12 and discharged into the atmosphere. For this purpose, the 3/2-directional valve 31 in the first consumer line 19 is in the shown pressure position and the switchable venting valve 25 is in the open position.

To fill an external vehicle tire 30 with fresh air from the atmosphere, the 3/2-directional valve 32 of the store pressure line 11 and the 3/2-directional valve 31 of the first consumer pressure line 19 are switched into the respective pressure positions. Here, all 2/2-directional valves 21 to 24 and the switchable venting valve 25 of the directional valve unit 2 are in the blocked position in order to prevent fresh and therefore moist pressurized air from reaching the air spring damping units 3 to 6. At the same time, the 2/2-directional valve 18 in the bypass line 16 is switched into its blocking position shown so that no fresh pressurized air can reach the pressurized air store via the store pressure line 11 and fill the pressurized air store unwontedly.

The blocked 2/2-directional valve 18 in the bypass line 16, however, prevents that, during the filling of the vehicle tire 30, dry and already compressed pressurized air can escape from the pressurized air store 7 via the 3/2-directional valve 32 (which is in the pressure position) into the store pressure line 11 and via the bypass line 16 from the closed loop of the air supply system and be used to fill the vehicle tire.

It is understood that the foregoing description is that of the preferred embodiments of the invention and that various changes and modifications may be made thereto without departing from the spirit and scope of the invention as defined in the appended claims.

What is claimed is:

1. An air supply system for a motor vehicle for supplying consumer means of a closed loop and for supplying an external consumer, the air supply system comprising:

a pressurized air store;

an intake connection communicating with the atmosphere;

a compressor;

a first consumer pressure line;

a second consumer pressure line connected to said external consumer;

a store pressure line connected to said compressor;

a first switchable 3/2-directional valve arranged in said first consumer pressure line;

a second switchable 3/2-directional valve arranged in said store pressure line;

said first and second 3/2-directional valves being configured so that:

said compressor conveys fresh air from the atmosphere through said intake connection, which bypasses said first and second 3/2-directional valves, said compressor conveys fresh air to at least one member selected from the group consisting of said pressurized air store and said external consumer;

said compressor transfers already compressed pressurized air between said consumer means and said pressurized air store;

a check valve in said store pressure line;

a bypass line connected into said store pressure line to bypass said check valve;

a throttle connected into said bypass line; and, a switchable blocking valve arranged in said bypass line to disable the functioning of said throttle.

2. The air supply system of claim 1, further comprising a dryer connected into said store pressure line.

3. The air supply system of claim 2, wherein said blocking valve is a switchable 2/2-directional valve.

4. The air supply system of claim 3, wherein said switchable 2/2-directional valve and said bypass throttle are configured as a valve combination.

5. The air supply system of claim 1, further comprising: a discharge valve; and, a discharge line leading away from said switchable discharge valve and being utilized as said second consumer pressure line for supplying said external consumer.

6. The air supply system of claim 1, wherein the intake connection comprises a check valve allowing unidirectional flow from the atmosphere to the compressor.

* * * * *